H. G. TILLE.
COMBINED STOCK AND HAY RACK FOR WAGONS.
APPLICATION FILED OCT. 25, 1907.
900,046.
Patented Sept. 29, 1908.
3 SHEETS—SHEET 3.
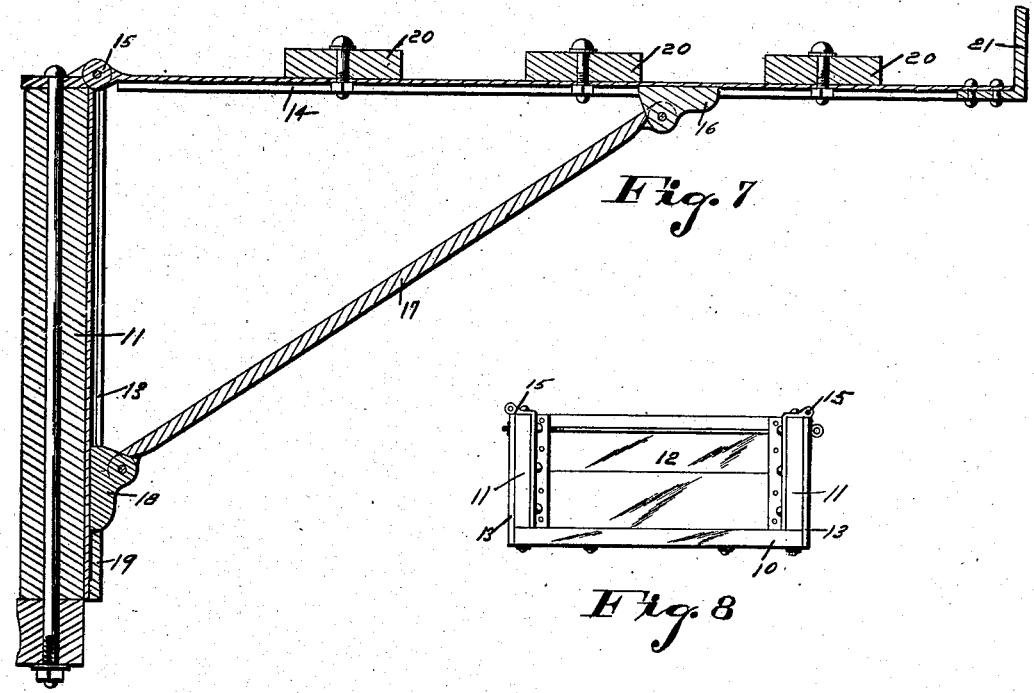
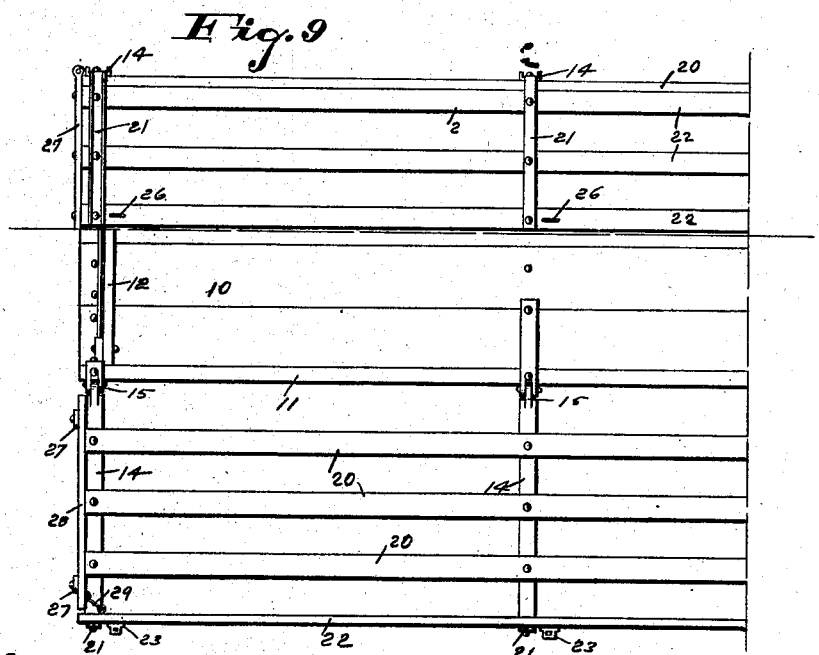
Witnesses.
R. H. Decker
F. C. Dahlberg
Inventor
H. G. Tille
by Onvig & Lane Attys.

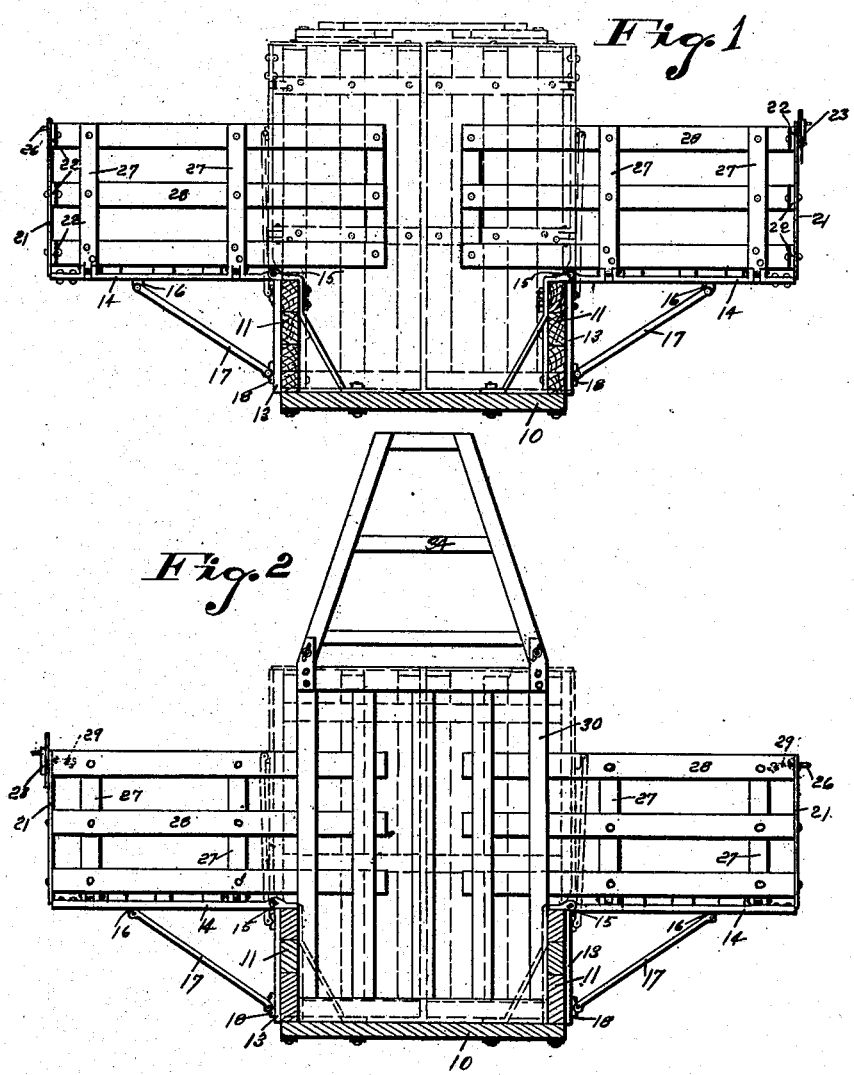

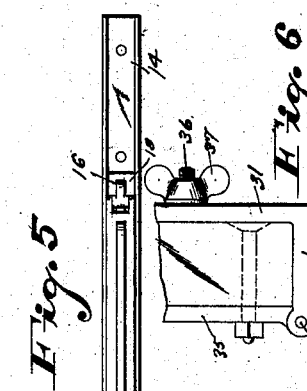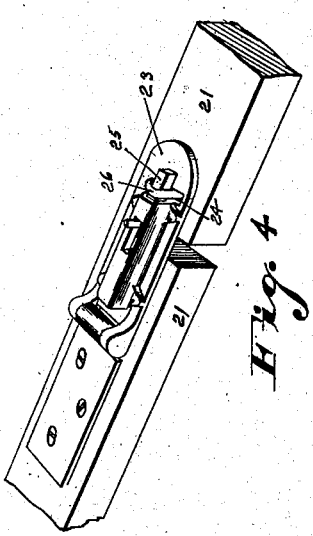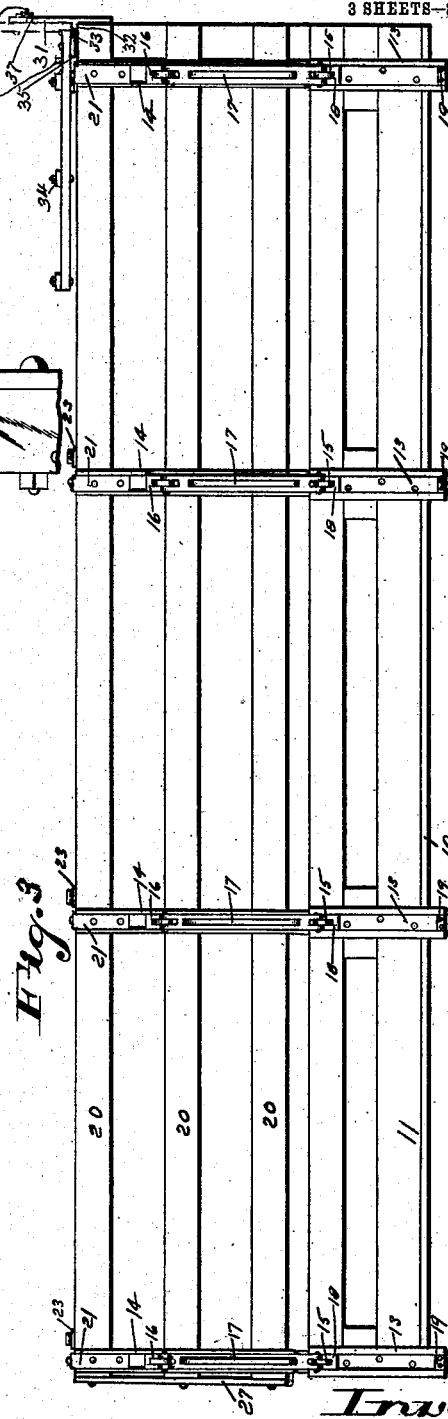

ved at proper distances apart to properly support the sides of the rack.

UNITED STATES PATENT OFFICE.

HENRY G. TILLE, OF DYSART, IOWA.

COMBINED STOCK AND HAY RACK FOR WAGONS.

No. 900,046.   Specification of Letters Patent.   Patented Sept. 29, 1908.

Application filed October 25, 1907. Serial No. 399,116.

*To all whom it may concern:*

Be it known that I, HENRY G. TILLE, a citizen of the United States, residing at Dysart, in the county of Tama and State of Iowa, have invented a certain new and useful Combined Stock and Hay Rack for Wagons, of which the following is a specification.

The object of my invention is to provide a device of the class designated, of simple and durable construction, so arranged that when used as a hay rack, it will be firmly supported to withstand all of the strains to which hay racks are ordinarily subjected, and which may be quickly and easily folded to position forming a completely inclosed and firmly braced stock rack.

A further object is to provide a device of this kind that may be quickly and easily changed from one of its positions to the other, without the use of tools.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a rear elevation of a wagon bed having my improvements applied thereto, the rack being shown by solid lines, in position for use as a hay rack, and by dotted lines in position for use as a stock rack. Fig. 2 shows a front elevation of same, to illustrate the position of the ladder at the front of the hay rack. Fig. 3 shows a side elevation of a wagon bed with my improvements applied thereto, and in position for use as a stock rack. At the forward end of same, the ladder is shown in its folded position by solid lines, and in its elevated position by dotted lines. Fig. 4 shows a detail perspective view illustrating one of the latches for connecting together the adjacent sides of the top of the rack, when in its position for use as a stock rack. Fig. 5 shows a bottom view of one of the brackets for supporting the rack sides upon the wagon bed. Fig. 6 shows an enlarged detail view illustrating the hinged connection for the ladder at the front of the rack. Fig. 7 shows an enlarged detail sectional view of a part of the wagon bed, and one of the rack supporting brackets, with one of the rack sides supported thereby. Fig. 8 shows a rear elevation of a wagon bed with an end gate therein, and the rack removed to show that the parts permanently attached to the wagon bed do not in any way interfere with the use of the wagon bed without the rack, and—Fig. 9 shows a top or plan view of the rear portion of a wagon bed with the rack on one side shown in an extended position, and the rack on the other side of the center shown in its position for use as a stock rack. The dotted lines in said figure show the center of the wagon bed.

Referring to the accompanying drawings, the reference numeral 10 is used to indicate the bottom of the wagon bed, and 11 the upright sides thereof. An end gate 12 of ordinary construction is detachably connected with the wagon bed in the usual way, and is illustrated herein simply for the purpose of showing that my attachment does not in any way interfere with same.

Attached to the outer sides of the wagon bed is a number of upright bars 13, each having a groove therein narrowest at its outer edge, as clearly shown in Fig. 5. Attached to the top of the wagon bed side directly above each of the bars 13 is a metal bracket arm 14 provided with a hinged joint at 15 and bolted to the inner face of the wagon side, as clearly shown in Figs. 1 and 2.

Fixed to the under surface of the bracket arm 14 near its outer end, is a lug 16, to which a bracket brace 17 is pivoted. This bracket brace is pivoted at its lower end to a sliding block 18, which is mounted in the groove of the bar 13, and is capable of free up and down movement therein, but it is held against outward movement on account of the groove being narrowest at its outer portion, and the said block 18 being fitted therein. The downward movement of the block 18 is limited by a stop 19, at the bottom of the bar 13. By this arrangement, it is obvious that the bracket arms 14 are pivotally connected to the tops of the wagon sides, and when the blocks 18 are at their lower limit of movement resting against the stops 19, then the bracket arms 14 will be firmly supported in a horizontal position against downward movement. If it is desired to raise the arms 14, the blocks 18 will freely slide in the grooved bars 13, and will permit the arms 14 to move to a vertical position as illustrated by dotted lines in Figs. 1 and 2. I preferably provide four of the brackets on each side of the wagon bed, and mounted upon each set of said brackets are the rails 20. On the outer end of each bracket is a bar 21 extended at right angles to the arm 14, so that it will stand in a vertical position when the arm 14 is horizontal. Attached to these bars 21 are the rails 22, which extend the full length of the wagon bed.

The part formed by the bars 21 and rails 22 is of such size that when the brackets are moved to a vertical position, the adjacent rails 22 on the opposite sides of the wagon will stand close to each other and thus form a top for a stock rack. In this connection, I have provided means for locking together the adjacent rails 22, as follows: On the bars 21 on one side of the wagon, I have provided a series of spring latches, each comprising a plate 23 hinged to the bar 21, and provided with a slot 24, and mounted on said plate 23 is a slide 25 of ordinary construction designed when extended, to pass over the slot 24. On the mating bar 21 is a loop 26 designed to project through the slot 24, and to receive the slide bolt 25.

In use, when the extension sides are moved to position for use as a stock rack, the operator may then cause the plates 23 to be moved to position where the loops 26 will extend through the slots 24, and then the bolts 25 may be set to position as shown in Fig. 4, for locking the adjacent bars 21 together.

I have provided for forming a rear end for the rack as follows: Hinged to each of the rear bracket arms 14 are two uprights 27 and connected with these uprights are the rails 28. The end pieces thus formed may be held in position by means of the hooks 29, as shown in Fig. 9, and these end pieces are of such size and shape that when the device is in position for use as a hay rack, they will assume substantially the positions shown in Fig. 1, and provide a rear end piece for a hay rack, and when the sides are moved to position for use as a stock rack, these end pieces will fit against the rear end of the wagon bed, and also stand close to each other, as shown by dotted lines in Fig. 1.

At the front of a wagon bed is a stationary frame composed of bars, and indicated by the numeral 30. At the top of this front piece 30, on each side, is a metal plate 31 having a rear extension 32 with a hinged joint 33 at the rear end thereof. The reference numeral 34 indicates a hay ladder of ordinary construction having hinged braces 35 at its lower end to engage the hinged members 33, in this way permitting the ladder to fold rearwardly over the top of the rack when in position for receiving stock. In order to hold this ladder in a vertical position when used for hay, I have provided in each side of the ladder a bolt 36 extended through an opening in the plate 31, and a winged nut 37 is provided for each bolt which, when in position as shown in Fig. 6, will hold the ladder upright, but which when removed, will permit the ladder to swing rearwardly and rest upon the top of the stock rack.

In practical use, and assuming the device to be in position for use as a hay rack, then the rails 20 will form extension bottoms on both sides of the wagon bed. The rails 22 will form upright ends for said extension bottom, and the frames 28 will form upright rear braces for said extension bottom. There will also be at the front of the wagon a front piece 30 with a ladder 34 at its top, thus forming the complete hay rack strongly and firmly supported in position. If it should be desired to use the wagon as a stock rack, the operator first moves one of the extension sides upwardly to a vertical position. He then moves the other side upwardly to a vertical position, fastens the latch devices at the top, and then lowers the ladder on top of the rack, all of which operations may be done by hand, and without the use of tools, and when the device is thus adjusted, a strong and durable stock rack is provided that is completely inclosed on all sides. Access may be had to the interior of the stock rack by simply disengaging the hooks 29 and permitting the frames composed of the parts 27 and 28 to swing rearwardly on their hinges.

The construction of the extension sides is the same at the front of the rack as it is at the rear, except that there are no extension end pieces attached thereto for the reason that the front of the wagon is provided with a permanent front, as clearly shown in Fig. 2.

Having thus described my invention, what I claim and desire to secure by Letters Patent of the United States, therefor, is—

1. In a device of the class described, the combination with a wagon bed, of bars fixed to the outer surfaces of the wagon bed sides, and containing grooves narrowest at their outer portions, blocks slidingly fitted in said grooves, bracket arms hinged to the wagon bed above said grooved bars, braces pivoted to the bracket arms and to said blocks, means for limiting the downward movement of said blocks, extension sides fixed to said bracket arms, extension frames fixed to the outer ends of the bracket arms at right angles thereto, said extension frames on the opposite sides being designed to stand close together when the extension sides are in vertical positions and latch devices for holding said extension frames together when in adjacent positions and extension end pieces fixed to the extension sides, and so shaped that their inner ends project inwardly beyond the sides of the wagon bed when the extension sides are horizontal, and said ends also extend to the bottom of the bed when the extension sides are vertical.

2. In a device of the class described, the combination with a wagon bed, of bars fixed to the outer surfaces of the wagon bed sides, and containing grooves narrowest at their outer portions, blocks slidingly fitted in said grooves, bracket arms hinged to the wagon bed above said grooved bars, braces pivoted to the bracket arms and to said blocks, means for limiting the downward movement of said blocks, extension sides fixed to said bracket arms, extension frames fixed to the outer ends of the bracket arms at right angles thereto, said extension frames on the opposite sides being designed to stand close together when the extension sides are in vertical positions, latch devices for holding said extension frames together when in adjacent positions, said latch devices each comprising a plate hinged to one of the frames and provided with a slot, a slide bolt connected with said plate and a loop fixed to the adjacent frame and designed to pass through said slot, and to receive said slide bolt.

3. In a device of the class described, the combination with a wagon bed, of a front frame fixed in an upright position at the front of the wagon bed, and having at each upper corner a plate provided with a rear extension, a ladder hinged to said rear extension and capable of swinging from a horizontal rearwardly inclined position to a vertical position, in engagement with said plates, and a bolt passed through each of the hinged ends of the ladder and designed to extend through the plates when the ladder is in a vertical position, and thumb nuts on said bolts for supporting the ladder in its vertical position.

Des Moines, Iowa, Oct. 7, 1907.

HENRY G. TILLE.

Witnesses:
J. H. ROZEMA.
ANNA SCHULTZ.